March 3, 1970    R. D. JOHNSTON    3,498,053
COMPOUND ENGINE
Filed Sept. 16, 1968
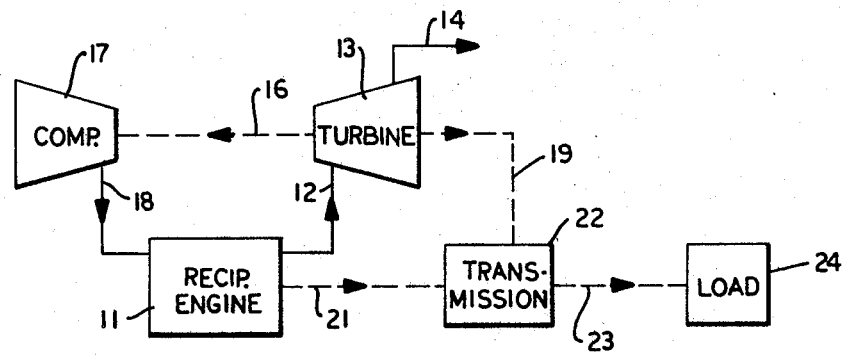
Fig. 1.
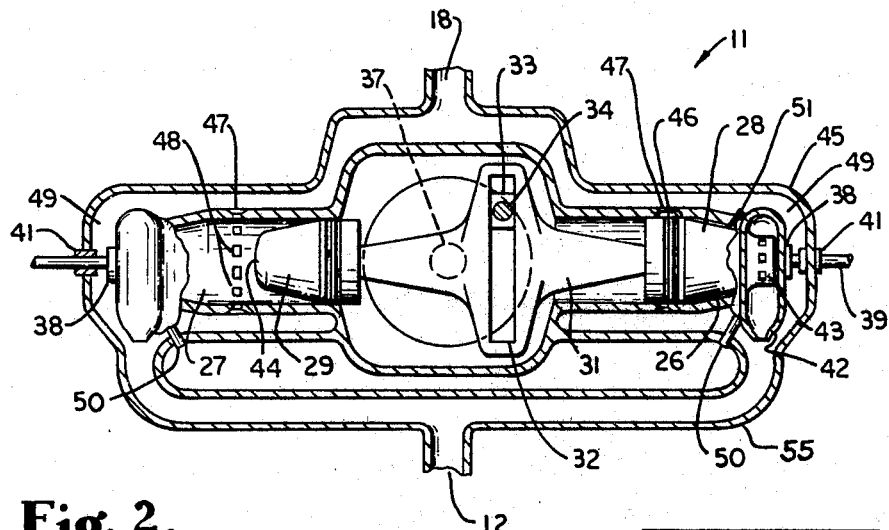
Fig. 2.
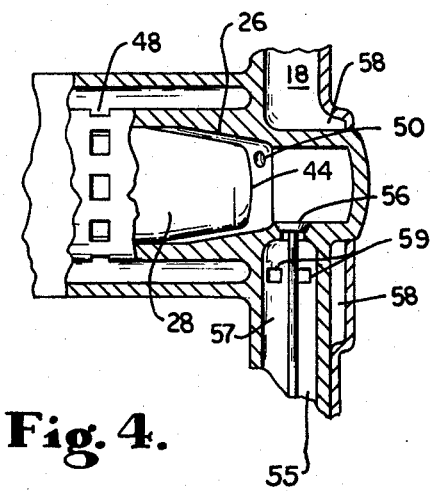
Fig. 4.
Fig. 3.
INVENTOR
ROBERT D. JOHNSTON
BY
Woodard, Weikart, Emhardt & Naughton
Attorneys United States Patent Office 3,498,053
Patented Mar. 3, 1970

3,498,053
COMPOUND ENGINE
Robert D. Johnston, Brownsburg, Ind., assignor to Belcan Corporation, Cincinnati, Ohio, a corporation of Ohio
Filed Sept. 16, 1968, Ser. No. 759,994
Int. Cl. F01k *23/14;* E02b *41/10*
U.S. Cl. 60—13                                10 Claims

ABSTRACT OF THE DISCLOSURE

A two-cycle, compression-ignition engine employs opposed pistons and rigid connecting rod between them with a Scotch yoke connection to an output shaft. A gas turbine machine has inlet means connected to the exhaust manifold of the engine and drives a compressor to supercharge the engine, the turbine also having an output shaft, the two output shafts being combined through a transmission to an output shaft for a load. The compressor supplies excess air for direct cooling of the cylinders internally, the heated air being received at the turbine inlet means. Ultra-high cylinder pressures and temperatures are employed.

BACKGROUND OF THE INVENTION

Field of the invention

This invention relates generally to compound engines and more particularly to an engine capable of unusually high cylinder pressures and operating temperatures for exceptional efficiency.

Description of the prior art

A variety of engine cycles and engines exists in the prior art. For heavy duty vehicle use, compression ignition engines are widely used today. Although these engines have certain beneficial characteristics, they are also characterized by comparatively poor mechanical efficiency and high heat losses from the cycle. There has been considerable interest in gas turbine engines for vehicles. Some disadvantages of these are low maximum cycle temperatures, low pressure ratios, and comparatively inefficient compression and expansion processes. Improvements in component efficiencies and increases in turbine inlet temperatures which would result in reduced specific fuel consumption for turbines, also produce increased power output necessitating engine size reduction for desired power capabilities, and these size reductions are generally accompanied by creation or aggravation of problems in the compression and expansion processes and efficiency thereof.

It is common practice to supercharge compression ignition engines in order to increase power output. Minor improvement in specific fuel consumption may be realized along with the increased output. However there are mechanical problems presented including, excessive bearing loads, flexing of cylinder heads and bolts, and excessive heat loads on valves and pistons. Therefore, in order to retain some benefits of supercharging and yet avoid the other problems created, typical practice is to reduce the compression ratio as required. This results in increased specific fuel consumption.

Thus it is seen that conventional approaches are beset with problems and these do not yield readily to efforts toward improvement.

It is well known that of the heat input to conventional internal combustion engines, about one third is available for output, about one third is lost to coolant, and about one third is lost in the exhaust. The present invention is directed toward recovery and utilization of heat energy which is typically rejected to coolant in conventional engines; and utilization of compression ratios with supercharging such as to produce higher than conventional cylinder pressures, without the attendant disadvantages. In addition to various features to be described in detail hereinafter, the combination according to the present invention utilizes a Scotch yoke, as mentioned briefly above. Prior art patents showing a Scotch yoke type of arrangement are as follows: 2,513,514, Poage, July 4, 1950; 3,195,420, Johannsen, July 20, 1965; 3,377,997, Combs, Apr. 16, 1968. Other examples of known prior art patents dealing with engines or components are as follows: 2,372,477, Engelhardt, Mar. 27, 1945; 2,655,906, Udale, Oct. 20, 1953; 2,889,682, Steven et al., June 9, 1959; 2,962,009, Buchi, Nov. 29, 1960; 2,991,616, Miller, July 11, 1961; 3,033,183, Erickson, May 8, 1962; 3,066,663, Rudy, Dec. 4, 1962; 3,309,865, Kauffmann et al., Mar. 21, 1967.

SUMMARY OF THE INVENTION

Described briefly, in a typical embodiment of the present invention, a reciprocating engine has opposed combustion cylinders with the pistons thereof connected together and moving in unison and coupled to an output shaft. A gas turbine is provided with an inlet connected to the exhaust of the reciprocating engine to drive the turbine. The turbine output drives a compressor supercharging the reciprocating engine, and providing an excess of air for internally cooling the combustion chambers during the scavenge operation and supplying the turbine with the air thus heated, for additional power from the turbine. Both the turbine and engine output shafts are employed and contribute to the total useful power output of the engine.

BRIEF DESCRIPTION OF THE DRAWINGS

The full nature of the invention will be understood from the accompanying drawings and the following description and claims.

FIGURE 1 is a schematic diagram of a compound engine according to a typical embodiment of the present invention.

FIGURE 2 is a cross section through the reciprocating engine component of the compound engine.

FIGURE 3 is a schematic view of the reciprocating engine with a portion cut away to illustrate the arrangement of the piston rod connections to the output shaft.

FIGURE 4 is an enlarged fragmentary section of a portion of the engine, similar to FIGURE 2, but employing poppet valves for the exhaust instead of sleeve valves.

DESCRIPTION OF THE PREFERRED EMBODIMENTS

Referring now to the drawings in detail, the reciprocating engine 11 supplies hot gas at 12 to the turbine 13 which exhausts to atmosphere at 14. The mechanical output of the turbine at 16 drives the compressor 17 which supplies air from atmosphere under pressure at 18 to the engine 11. The other turbine output 19 is connected along with the engine output 21 to transmission means 22 from which is delivered by the output 23 to a load 24. By way of example, the compression ratio for the reciprocating engine itself would be 15.0 to 1.0. The pressure ratio of compressor 17 would be 4.0 to 1.0. The turbine expansion ratio would be 4.0 to 1.0. For achievement of best results, the pressure ratio of the compressor must be in the range between 2.0 to 1 and 5.0 to 1. Peak cylinder pressure expected in the reciprocating engine would be between 1,000 and 5,000 p.s.i. The compressor and turbine can be simple good quality radial or axial flow units.

The transmission 22 can be a variable ratio gear type, hydraulic type, electric type, or variations thereof. The load can be virtually anything and in the application contemplated for widest use of this engine, it would be a vehicle itself.

Referring now to FIGURE 2, the engine 11 has opposed cylinders 26 and 27 therein receiving pistons 28 and 29, respectively. These pistons are connected together by a rigid connecting rod 31 so that during the power stroke of one, compression can occur in the other cylinder. A slot 32 is provided in the connecting rod, receiving a slider shoe 33 received on the crank pin 34 of crank throws 36 of the crankshaft 37. Reciprocating motion of the pistons is thereby translated to rotary motion of the shaft 37 in this scotch yoke type of mechanism.

At the cylinder head, a sleeve valve 38 is employed and actuated by a rod 39 received in a bushing at 41. Suitable actuating mechanism of a conventional kind for sleeve valves can be employed, so is not shown. This valve controls the communication of the cylinder 26 with the exhaust torus 42 through the ports 43.

The pistons have frustoconical domes as shown, and these are comparatively high so that the outer convex heads 44 thereof can operate at very high temperatures in the range of 700 degrees F. to 1500 degrees F. High chrome-nickel alloys of the type used in present turbine blades can be used in such pistons. While the remote heads of these pistons can operate at very high temperatures, the distance between them and the rings, together with the arrangement as will be further described, enables the piston ring area at 46 to be operated at less than 500 degrees F. for normal lubrication.

Not only are the pistons provided with the frustoconical shape wherein the vertex angle of the cone involved is a small angle, the cylinder walls are also similarly formed to fittingly receive these pistons, although sufficient clearance is provided, of course, to prevent actual wedging mechanical contact. In addition to the frustoconical shape of the interior of the cylinders, the surface may have a coating of thermal insulating material. An example is aluminum oxide flame plated on the internal surface. The cylinder walls and head are of one-piece construction, and the upper walls (those more distant from the crankshaft) and head are provided with a shroud as at 45, for example. Fuel injector supplies are designated schematically at 50.

The air from the compressor is received at 18 into the shroud 45 around the cylinders of the engine, from where it is discharged to the cylinders at the appropriate times by means of the circular array of ports 48 according to typical two-cycle engine practice. In addition to that, air from the compressor at compressor discharge pressure is provided continuously through the shroud portion 45 over the cylinder head and exhaust torus in the chamber 49 for cooling the walls, head, and valve, and discharged to the exhaust manifold 55 for utilization in the turbine 13. The exhaust from the torus is discharged directionally into the manifold to avoid interference with (and in fact aid by ejector action) the passage of heated air from the shroud into the manifold 55.

In addition to providing the air required for combustion, according to typical diesel engine practice, the compressor supplies an excess of air, more than typical in diesel engine practice, including a flow of air through the cylinder during the scavenging portion of the cycle. The air passing through the cylinder moves in close proximity to the cylinder wall throughout its travel toward the cylinder head as indicated by the arrow 51 and takes heat both from the piston head and from the cylinder wall and discharges it into the exhaust manifold. Accordingly the cylinder is internally cooled and the heat derived from this cooling is delivered directly to the turbine. External cooling by means of a radiator or fins is not required.

Referring now to FIGURE 4, the piston is shaped as in the embodiment of FIGURE 2, and so is the cylinder 26. However the cylinder head differs somewhat in that it receives the poppet valve 56 therein, the valve stem and guide (not shown) being disposed in the exhaust passageway 57. Cooling air therefor is derived from the manifold 18 connected to the compressor, and supplied through chamber and duct 58 and the ports 59 to passageway 57. The air then enters the manifold 55 and is conveyed to the turbine. The heat picked up by the air in passing around the upper end of the cylinder head and around the exhaust valve stem is utilized in the turbine.

An engine constructed according to the present invention and occupying a volume approximately three feet square by two feet high could develop an output of 700 horsepower at a specific fuel consumption of 0.3 pound per horsepower-hour, with the engine having the following characteristics:

TABLE

| | |
|---|---|
| Compressor adiabatic efficiency_____percent__ | 84 |
| Compressor pressure ratio_____ | 4.0 to 1.0 |
| Piston unit compression ratio_____ | 15.0 to 1.0 |
| Fuel air ratio (total)_____ | .03 |
| Combustion efficiency_____percent__ | 98 |
| Piston unit mechanical efficiency_____do____ | 85 |
| Turbine expansion ratio_____ | 4.0 to 1.0 |
| Turbine adiabatic efficiency_____percent__ | 85 |
| Combined turbine power train efficiency_____do____ | 81 |
| Overblow and bypass air_____do____ | 50 |
| Number of cylinders (two banks of seven)_____ | 14 |
| Bore-stroke (effective)_____ | 3.5″ x 3.5″ |
| Engine speed _____r.p.m__ | 1800 |
| Volumetric efficiency_____percent__ | 80 |
| Total compressor air flow _____lbs. per sec__ | 1.9 |
| Power _____HP__ | 700 |
| Specific fuel consumption_____lb./HP. hr__ | 0.3 |

The efficiencies specified above for the various components are on the conservative side in that higher levels have been demonstrated in the flow ranges involved. While conventional engines of 700 horsepower are typically larger than this, specific fuel consumptions are at least 33% greater.

From the foregoing description, it may be seen that the present invention avoids heat rejection to atmosphere by conventional liquid air cooling means, but instead maintains a hot cylinder head and piston dome. This makes possible adding heat from the cylinder head and piston (which would conventionally be rejected to atmosphere) to air from the compressor at essentially compressor discharge pressure, for conversion in the turbine to shaft output energy. The engine is cooled substantially exclusively by air delivered from the compressor through the shrouds to the turbine and internally through the cylinders themselves to the turbine. The engine materials and configuration are such as to handle the higher temperatures and pressures involved.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. A power plant comprising:
   a reciprocating engine having combustion cylinders with air inlet means and exhaust discharge means and pistons coupled to an output member having a rotational axis under said cylinders, said pistons having rings thereon wiping portions of said cylinders near the axis of said output member, large internal areas of walls of said cylinders, extending in the direction of the axes of said cylinders and remote from the axis of said output member, being traversed by said pistons but untouched by rings of said pistons during reciprocating traversal of said cylinders by said pistons, thereby permitting high temperature operation without destruction of lubrication at the piston rings;

a gas turbine machine having gas inlet means and exhaust means and having a turbine;

means coupling said turbine to said output member;

a compressor with air inlet and discharge means and a coupling to said turbine to be driven by said turbine, and compressor discharge means being coupled to said combustion cylinders to supply cooling air thereto;

means for supplying fuel to said cylinders for unwiped wall area operation well above 500° F.;

said turbine machine gas inlet means being in communication with said walls of said cylinders to receive said cooling air therefrom;

and flow directing means coupled between said compressor discharge means and said turbine machine inlet means and directing flow of said cooling air on portions of said combustion cylinders operating at temperatures sufficiently high for heat transfer therefrom to said air at a level sufficient that more shaft output power is developed from said air by said turbine than is used by said compressor to supply said air from said compressor to said turbine.

2. The power plant of claim 1 wherein:

said engine has cooling fluid passageway means around portions of said cylinders, with said cylinder portions providing inner wall portions of said passageway means;

the coupling of said compressor discharge means to said cylinders is to the exterior of said cylinders through said passageway means;

the coupling of said turbine gas inlet means to said cylinders being to the portion of said passageway means where the inner wall is provided by the portions of said cylinder walls having said remote untouched areas thereon where heat transfer from said cylinders to air in said passageway means occurs at the highest temperature to receive from said passageway means the hottest air therein.

3. The power plant of claim 2 wherein:

the coupling of said compressor discharge means to said cylinders includes said coupling through said passageway means and a coupling to the interiors of said cylinders through said engine air inlet means for supercharging said engine;

said gas inlet means are coupled to said exhaust discharge means to receive hot gas therefrom;

said passageway means and the interiors of said cylinders receive air from said compressor at substantially compressor discharge pressure, the hot air from said passageway portion being mixed with the exhaust from said engine exhaust discharge means and passed through said turbine, the cooling of the hottest portions of said engine cylinders being effected primarily by air delivered to said turbine from said compressor through said passageways and through the interior of said cylinders.

4. The power plant of claim 1 wherein:

said pistons are arranged in pairs;

each piston of a pair being disposed and oriented opposite the other piston of a pair and connected to the other piston to move in unison therewith.

5. The power plant of claim 1 wherein:

said pistons have generally high frustoconical domes of small angle extending downward from the heads thereof, said cylinders having generally frustoconical portions to fittingly receive said piston domes, said pistons having rings thereon below and remote enough from said heads to operate at temperatures of less than 500 degrees Fahrenheit while said heads operate at temperatures in excess of 900 degrees Fahrenheit.

6. The power plant of claim 1 wherein:

the normal operating temperatures of portions of said pistons is in the range of 700 degrees F. to 1500 degrees F. at the top of heads of said pistons.

7. The power plant of claim 6 wherein:

said heads of said pistons have a coating of thermal insulation material on the surfaces exposed to the hot combustion gas.

8. The power plant of claim 4 and further comprising:

a Scotch yoke connecting said pistons to said output member.

9. The power plant of claim 3 wherein:

said engine is a compression ignition engine and the compression ratio of said engine is in the range of 12 to 17; and the pressure ratio of said compressor is in the range between 2.0 and 5.

10. A method of deriving power from a reciprocating internal combustion engine having combustion chamber means and an output shaft and having a turbine and compressor, said method comprising the steps of:

supplying fuel to said engine and burning it therein;

delivering exhaust gases from said engine to said turbine to derive power from said gases in said turbine;

delivering shaft output power from said turbine to said compressor and to said engine output shaft;

supplying cooling air from said compressor to said combustion chamber means and then from said combustion chamber means to said turbine;

transferring heat from said combustion chamber means to said air at a temperature level sufficient that more shaft output power is developed from said air at said turbine than is used to supply said air from the inlet of said compressor to said turbine;

reciprocating a piston in first and second portions of said combustion chamber means;

maintaining said first portion at a temperature excessive for piston ring lubrication, and said second portion at a temperature enabling lubrication of piston seal means thereon;

and avoiding contact of said first portion by any means mounted to said piston.

References Cited

UNITED STATES PATENTS

| 2,583,651 | 1/1952 | Horning | 60—261 |
| 3,164,140 | 1/1965 | Nuttall | 123—41.65 |
| 1,062,308 | 5/1913 | Trummel. | |
| 1,147,280 | 7/1915 | Thomas. | |
| 1,616,391 | 2/1927 | Prouty. | |
| 2,578,028 | 12/1951 | Udale | 60—13 |
| 2,585,029 | 2/1952 | Nettel | 60—13 |
| 3,066,663 | 12/1962 | Rudy. | |
| 3,232,044 | 2/1966 | Gratzmuller | 60—13 |

FOREIGN PATENTS 916,985  9/1946  France.

MARK M. NEWMAN, Primary Examiner

DOUGLAS HART, Assistant Examiner

U.S. Cl. X.R.

123—41.65, 65, 119